United States Patent [19]
Fujii et al.

[11] Patent Number: 6,036,814
[45] Date of Patent: Mar. 14, 2000

[54] THERMAL TRANSFER ROLL FOR MANUFACTURE OF LAMINATE PLATE, METHOD OF HEATING METALLIC SHEET BY MEANS OF THERMAL TRANSFER ROLL, AND LAMINATE PLATE MANUFACTURING APPARATUS PROVIDED WITH THERMAL TRANSFER ROLL

[75] Inventors: Tadashi Fujii; Hiroshi Inazawa, both of Yamaguchi-ken, Japan

[73] Assignee: Toyo Kohan Co., Ltd., Tokyo, Japan

[21] Appl. No.: 09/011,056

[22] PCT Filed: Aug. 2, 1996

[86] PCT No.: PCT/JP96/02182

§ 371 Date: Feb. 4, 1998

§ 102(e) Date: Feb. 4, 1998

[87] PCT Pub. No.: WO97/06001

PCT Pub. Date: Feb. 20, 1997

[30] Foreign Application Priority Data

Aug. 4, 1995 [JP] Japan .................................... 7-218327

[51] Int. Cl.[7] .................................................. B32B 31/00
[52] U.S. Cl. ..................... 156/324; 156/555; 156/582; 156/583.1; 156/583.4; 492/46
[58] Field of Search ...................... 156/555, 580, 156/582, 583.1, 583.4, 324; 492/46

[56] References Cited

U.S. PATENT DOCUMENTS

| | | | |
|---|---|---|---|
| 3,258,386 | 6/1966 | Blythe | 156/583.1 |
| 4,050,886 | 9/1977 | Moser | 432/60 |
| 4,105,491 | 8/1978 | Haese et al. | 156/553 |
| 5,209,283 | 5/1993 | Miltzow et al. | 164/448 |
| 5,292,298 | 3/1994 | Scannell | 492/46 |
| 5,655,596 | 8/1997 | Zaoralek | 165/90 |
| 5,659,866 | 8/1997 | Kim | 399/330 |

FOREIGN PATENT DOCUMENTS

| | | |
|---|---|---|
| B-72386/94 | 2/1995 | Australia . |
| 7195651 | 8/1995 | Japan . |
| 95/04653 | 2/1995 | WIPO . |

Primary Examiner—James Sells
Attorney, Agent, or Firm—Browdy and Neimark

[57] ABSTRACT

When a heat transfer pattern comprising a plurality of recesses is formed on a surface of a roll to provide a thermal transfer roll, a metallic sheet is heated by the thermal transfer roll to form a laminate plate and an integral drum-bottom type can is made of the laminate plate, ring-shaped scratches due to the thermal strain are produced on portions of the can which face recesses of the laminate plate. Bubbles are liable to be formed on the scratches so that corrosion resistance around the bubbles is degraded. The invention has its object to provide a thermal transfer roll free from such scratches. In the invention, a conventional transfer roll having a plurality of recesses formed in a surface thereof is covered by a thin metallic sleeve (130) over a substantially entire surface thereof. Alternatively, the recesses (106) are closed by a cover body (132). While spaces in the recesses serve as heat resistance to form a similar heat transfer pattern to a conventional one, a surface of the roll is made flat to prevent scratches from being produced on a laminate plate.

8 Claims, 3 Drawing Sheets

THERMAL TRANSFER ROLL FOR MANUFACTURE OF LAMINATE PLATE, METHOD OF HEATING METALLIC SHEET BY MEANS OF THERMAL TRANSFER ROLL, AND LAMINATE PLATE MANUFACTURING APPARATUS PROVIDED WITH THERMAL TRANSFER ROLL

FIELD OF ART

The present invention relates to a technique for laminating a resin film on a metallic sheet, and more particularly, a thermal transfer roll which provides portions where crystal orientation is held and portions where crystal orientation is not held on the resin film adhered to the metallic sheet, and a method for heating the metallic sheet by means of the thermal transfer roll, and an apparatus for producing a laminate plate with the thermal transfer roll.

BACKGROUND

Conventionally, a two piece can which is produced by integrally joining a can body with a can bottom has been popularly used for beverage cans and food cans. In general, these two piece cans are made of a substrate which is produced by laminating a resin film on a metallic sheet such as a steel sheet or an aluminum sheet. Namely, a portion of the two piece can where the can body and the can bottom are integrally merged is formed by applying a drawing, an ironing or a stretching to the laminate plate.

In such a forming, a denting is liable to occur at the bottom portion of the can so that the can bottom is required to have the enough denting resistance (an index that shows the resistance to the occurrence of crack to the resin film when the denting occurs at the can ). On the other hand, the can body portion is required to have a resistance to peeling off since the resin film is liable to be peeled off during the forming such as drawing.

For improving the denting resistance, it has been proposed to use bi-axially elongated and crystal oriented resin film. However, such a crystal oriented resin film tends to be peeled off easily at the time of drawing or ironing. Accordingly, it is desirable to use the laminated crystal oriented film at the bottom portion which is liable to be dented, while it is desirable to use the laminated film which has no crystal orientation at the can body portion.

As a device which meets the above-mentioned requirements, the applicant of the present invention has proposed a device 100 shown in FIG. 6 of producing a laminate plate adapted for the manufacturing of cans which are integrally provided with can bottom, which is disclosed in Japanese laid-open publication HEI 7-195651.

In operation of the device, a metallic sheet 101 is heated by a plurality of heating rolls 104 up to a temperature which is more than a temperature necessary for adhering of a resin film 102 but below a temperature lowring the degree of the crystal orientation.

Subsequently, while being applied a suitable tension by a tension roll 110, the above-mentioned metallic sheet 101 is made come into contact with a thermal transfer roll 105 which is a final heating roll. The thermal transfer roll 105 has a sufficiently high surface temperature to reduce the degree of crystal orientation of the resin film 102 and is provided with a plurality of indented portions 106 as shown in FIG. 7.

Portions of the metallic sheet which come into contact with the surface of the thermal transfer roll 105 is heated to the temperature which reduces the degree of crystal orientation of the resin film, while portions of the metallic sheet which face the indented portions 106 are not heated so that the portions are held at a temperature which does not reduce the degree of crystal orientation.

Thereafter, when the resin film 102 is adhered to the metallic sheet by means of a laminating roll 107 to produce the laminate plate 103, the resin film 102 with a reduced degree of crystal orientation is adhered to the portions of the metallic sheet which comes into contact with the surface of the thermal transfer roll 105 while the resin film 102 where the degree of crystal orientation is held unchanged is adhered to the portions which face the indented portions. The laminating roll 107 is pressed by a back-up roll 111 so as to tightfittingly adhere the resin film 102 to the metallic sheet 101.

A marking device 112 is provided for providing given marks on the laminate plate 103 to identify blanking positions which become necessary in subsequent blanking operation.

In FIG. 8, blanks 126 which are taken out by blanking a laminate plate 103 produced by the production device 100 are shown in the imaginary line, wherein the the laminate plate 103 is punched out by a press. The portions 125 which face the indented portions 106 of the thermal transfer roll define the center of each punching. These blanks 126 are subjected to a press forming such as a deep drawing so as to obtain can stock material which is composed of the can body and the can bottom forming an integral unit, wherein the portion 125 which face the indented portion 106 of the thermal transfer roll is to be formed into the can bottom and a remaining annular or doughtnut-shaped portion is to be formed into the can body.

With such a production device 100, since a high temperature is given to the portions of the metallic sheet 101 other than the above-mentioned doughtnut-shaped portions, which are, the portions facing the indented portions 106, the adhering strength of the portions of the resin film which correspond to the can body is increased so that the resin film on the can body can withstand a heavy forming applied to the resin film at the time of press forming such as deep drawing.

Although the degree of crystal orientation of the resin film 102 on the can body is lowered, the degree of crystal orientation can be increased again by a heavy forming which is applied to the resin film 102 at the time of press forming such as deep drawing.

On the other hand, the resin film having a high crystal orientation is adhered to the can bottom so that the can stock material which is produced as a final product has a high degree of crystal orientation and accordingly a sufficient denting resistance at the can body as well as at the can bottom.

However, when practically producing the laminate plate for two piece cans with the above-mentioned thermal transfer roll 105, the metal sheet exhibits a temperature difference between the indented portions and the remaining doughtnut-shaped portions on this thermal transfer roll 105 so that the metal sheet extends or shrinks due to a thermal strain. Furthermore, a frictional force between the corners of indented forming portions and the metal sheet which extends or shrinks on this thermal transfer roll is increased. Due to these causes, the metal sheet takes ring-shaped scratches having the same diameter as that of the indented portion at the places where the metal sheet comes into contact with the indented portions on the thermal transfer roll 105. Each scratch has a width of several tens $\mu$m and a depth of 1 to 3 $\mu$m.

When the resin film is laminated on the metal sheet thereafter, these ring-shaped scratches become a major cause of the occurrence of bubbles between the metal sheet and the resin film. When can containers are manufactured using the laminate plate for two-piece can use in which bubbles are formed as a can stock material, a corrosion resistance of the laminate plate is drastically decreased at peripheries of the bubble formed portions.

The above-mentioned ring-shaped scratches can be removed by decreasing the frictional force between the metal sheet and the thermal transfer roll. Accordingly, the applicant of the present application has made efforts to resolve the occurrence of the ring-shaped scratches by applying a rounding working to the corners of the indented portions and increasing the precision of the finish of the working. This method has succeeded in reducing the occurrence of the ring-shaped scratches and making the size of the ring-shaped scratches smaller to some extent. With this method, however, it has been proved impossible to restrict the degree and size of the ring-shaped scratches to an extent that they fall in an industrially allowable range, namely, at a degree where no bubble is formed between the metal sheet and the resin film of the laminate plate for manufacturing cans having the can body and the can bottom as an integral unit.

The present invention has been made in view of the above and it is an object of the present invention to provide a thermal transfer roll which can prevent the occurrence of the above-mentioned ring-shaped scratches at indented portions and can give a desired temperature distribution to the metal sheet. It is another object of the present invention to provide a method of heating a metal sheet by means of the thermal transfer roll and a manufacturing apparatus for laminate plate provided with the thermal transfer roll.

BRIEF EXPLANATION OF DRAWINGS

FIGS. 1a and 1b are one embodiment of a thermal transfer roll of the present invention, wherein FIG. 1a is a perspective view of the thermal transfer roll and FIG. 1b is a transverse cross-sectional view thereof.

FIGS. 4a-4c show a manufacturing method of the second embodiment of the transfer roll of the present invention, wherein FIG. 4a is a perspective view of a curved plate and FIG. 4b is a perspective view of a lid and FIG. 4c is a perspective view of a lid fixed with positioning jig.

FIGS. 5a and 5b show a manufacturing method of the second embodiment of the transfer roll of the present invention, wherein FIG. 5a is a cross-sectional view of the main portion of the thermal transfer roll having indented portions being covered with the lid and FIG. 5b is a cross-sectional view of the main portion of the thermal transfer roll having indented portions already covered with the lid and a jutting portion removed from the lid.

BEST MODE FOR PRACTICING INVENTION

Figure 1A:
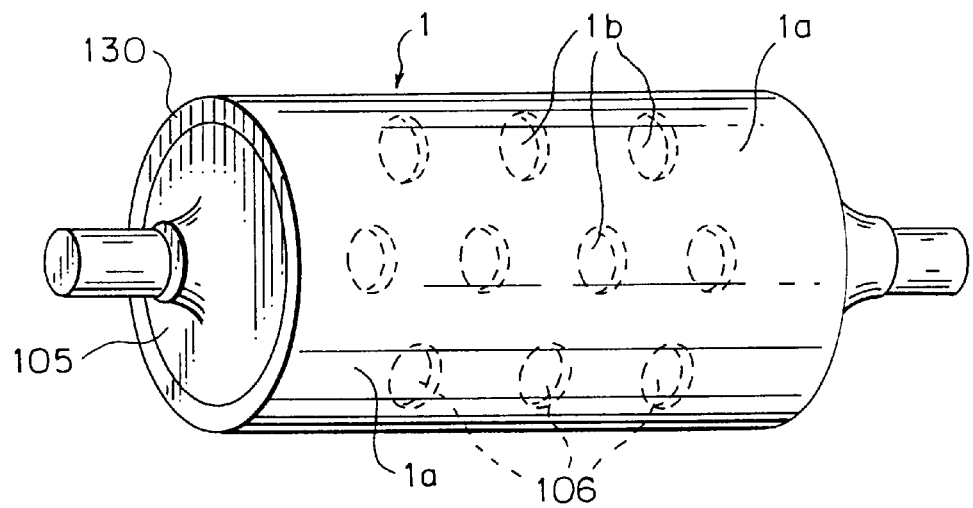

For achieving above objects, the present invention is characterized in that in a thermal transfer roll of manufacturing laminate plates which comes into contact with a metal sheet and heats the sheet, by varying an inner thermal resistance of the thermal transfer roll while holding the surface of the roll flat or planar, a desired heat transfer pattern comprising a high temperature portion and a low temperature portion can be formed on the roll surface.

The above-mentioned heat transfer pattern may be constructed such that the heat transfer pattern comprises indented portions formed on the thermal transfer roll corresponding to the low pressure portions of the heat transfer pattern and a thin metal sleeve which covers almost an entire surface of the thermal transfer roll. Alternatively, the above-mentioned heat transfer pattern may be constructed such that the low temperature portions comprises indented portions formed on the thermal transfer roll and lid members which are fixed to the thermal transfer roll in order to close the indented portions.

The method of heating a metal sheet by means of a thermal transfer roll of the present invention is characterized in that a desired heat transfer pattern comprising a high temperature portion and a low temperature portion is formed on the flat roll surface, the thermal transfer roll is heated until the high temperature portions has a temperature which enables a lowering of the degree of crystal orientation of a resin film having the crystal orientation, the thermal transfer roll is made come into contact with the metal sheet so as to heat portions of the metal sheet which comes into contact with the high temperature portions of the thermal transfer roll up to a temperature which enables the lowering of the degree of crystal orientation of the resin film, and portions of the metal sheet which come into contact with the lower temperature portion of the thermal transfer roll is heated up to a temperature which is more than a temperature necessary for adhering the resin film and less than a temperature necessary for lowering the degree of the crystal orientation.

Alternatively, the above-mentioned high temperature portion of the thermal transfer roll heats the above-mentioned metal sheet while the above-mentioned lower temperature portion of the thermal transfer roll cools the above-mentioned metal sheet.

The laminate plate manufacturing apparatus provided with a thermal transfer roll of the present invention is characterized in that in the laminate plate manufacturing apparatus which comprises a plurality of heating rolls which come into contact with a metal sheet so as to successively elevate the temperature of the metal sheet and heats at least one surface of the metal sheet up to a temperature which is more than a temperature necessary for adhering a thermoplastic resin film and a laminating roll which adheres the thermoplastic resin film supplied to at least one surface of the metal sheet onto the metal sheet under pressure, a thermal transfer roll having a flat surface and a desired heat transfer pattern which is made of high temperature portions and low temperature portions on the roll surface is provided prior to the laminating roll.

Since the surface of the roll on which indented portions are formed is covered with a sleeve, the surface of the roll becomes flat or planar. The portions which do not correspond to the indented portions formed on the surface of the roll have a high temperature because of a good heat transfer while the portions which cover the indented portions have a low temperature because of a poor heat transfer. In this manner, by varying the thermal resistance inside the roll, a desired heat transfer pattern can be obtained while holding the surface of the roll flat or planar so that the metal sheet takes no damages even when the metal sheet which is subjected to the thermal transfer is extended or shrinked due to a thermal strain.

Furthermore, according to the the present invention, with only one thermal transfer roll, the heat moving direction relative to an object to which heat is transferred can be two-directional. Namely, when the metal sheet is uniformly heated at an intermediate temperature between the temperature of the high temperature portion and the temperature of the low temperature portion, the metal sheet is further heated at the high temperature portion while the other portion of the same metal sheet is cooled at the lower temperature portion so that heating and cooling can be carried out simultaneously. This is because that since the surface of the thermal transfer roll has no unevenness, the entire surface area becomes a thermal transfer surface and that the surface of the thermal transfer roll has the prescribed pattern of temperature distribution. In the thermal transfer roll of the present invention, it becomes possible to set desired cooling and heating amounts simultaneously by heating or cooling the thermal transfer roll from the outside.

The embodiment of the present invention is hereinafter explained in detail referring the drawings.

Figure 1B:
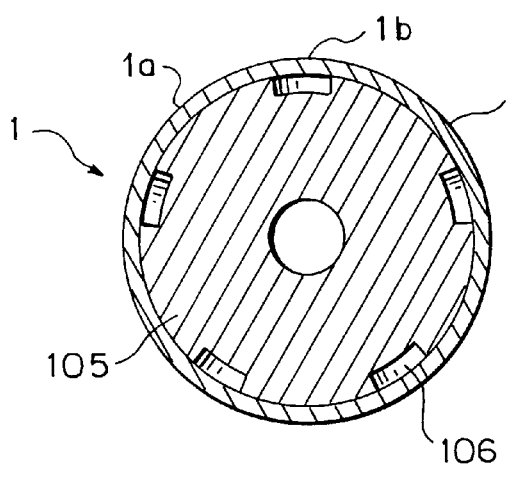
Figure 6:
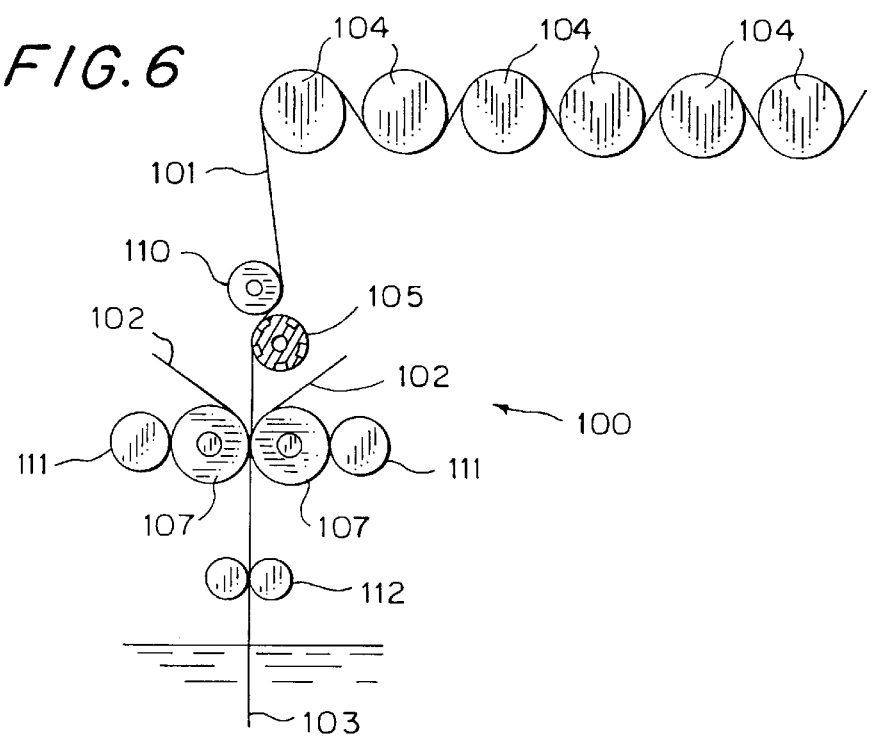
FIG. 6 is a view showing a construction of a conventional laminate plate manufacturing apparatus.

FIGS. 1a and 1b show the first embodiment of the thermal transfer roll of the present invention, wherein the thermal transfer roll is mounted in place of the thermal transfer roll 105 in the laminated plate manufacturing apparatus shown in FIG. 6. FIG. 1a is a perspective view showing an outer appearance of a thermal transfer roll 1, while FIG. 1b is a cross-sectional view of the same.

First, one example of the method of producing the thermal transfer roll 1 of the present invention is explained.

Figure 2:
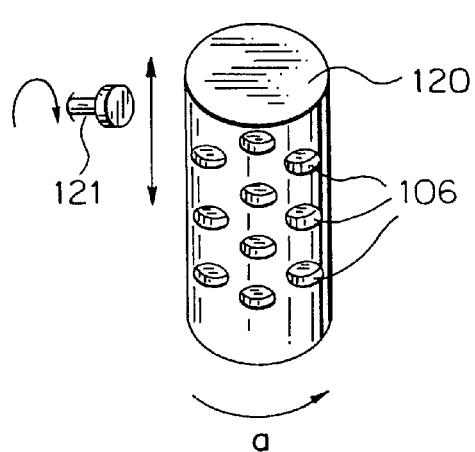
FIG. 2 is a perspective view showing a manner of forming indented portions in a roll material.
Figure 3:
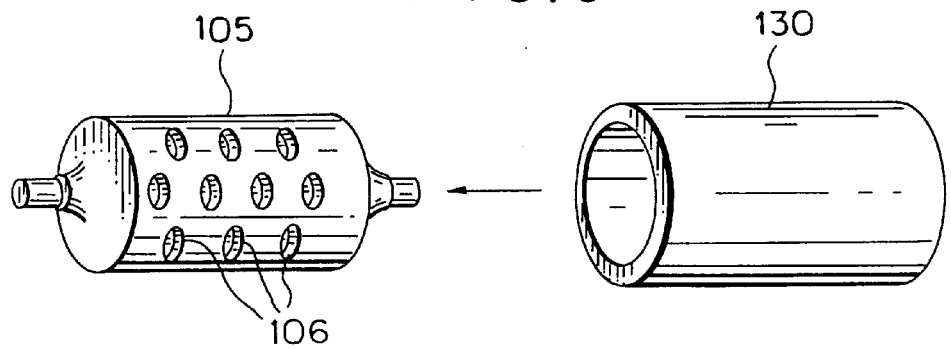
FIG. 3 is an exploded perspective view of the first embodiment of the thermal transfer roll of the present invention.
Figure 7:
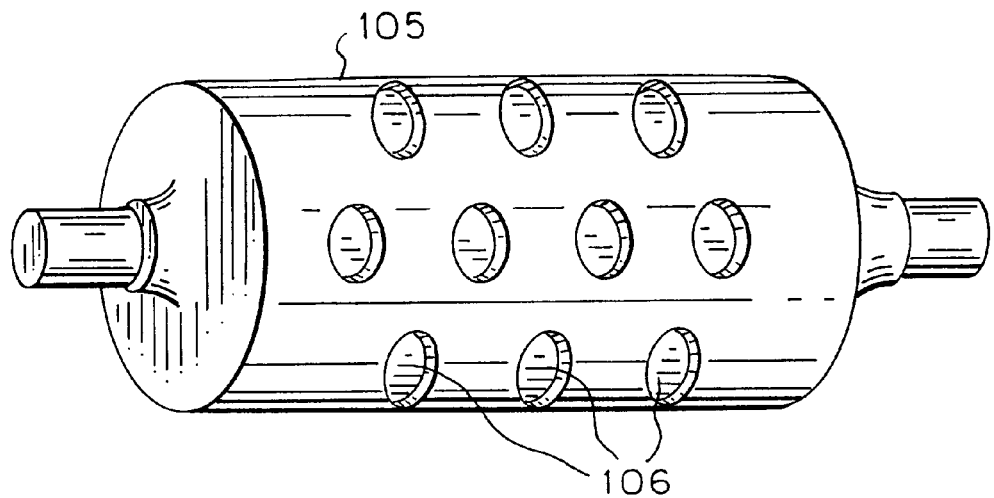
FIG. 7 is a perspective view of a conventional thermal transfer roll.
Figure 8:
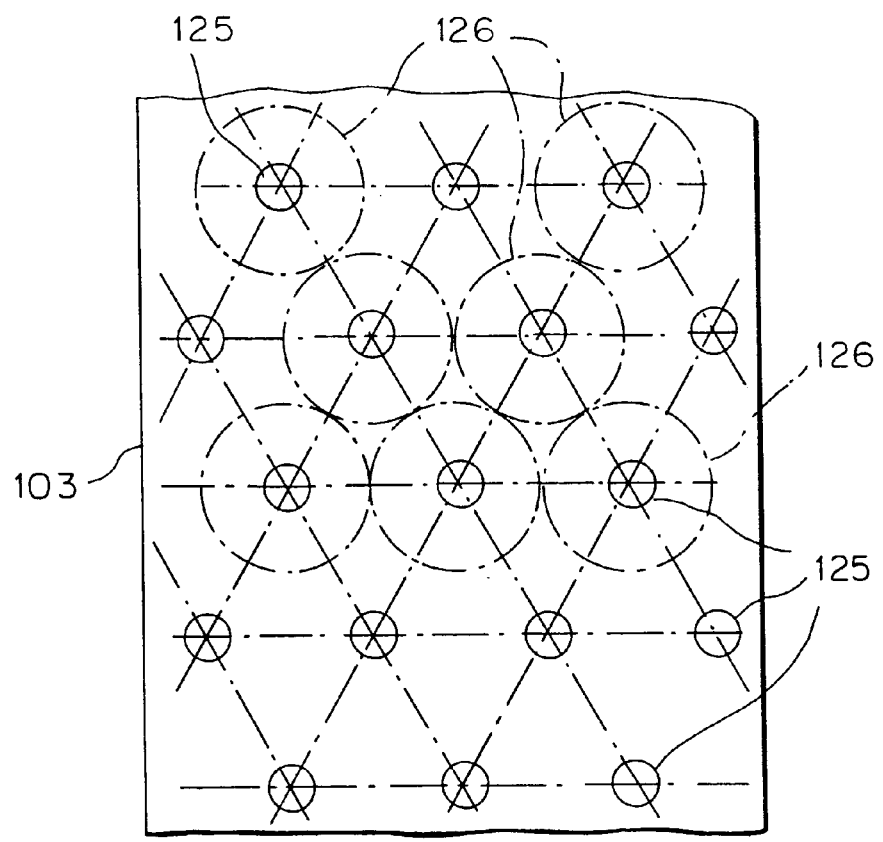
FIG. 8 is a view showing a blank sheet explaining the manner of punching blanks from the laminate plate.

As shown in FIG. 2, indented portions 106 which define cavities are formed in a roll material 120 having a flat or planar surface by means of an end mill 121. The end mill 121 is moved in an upward or downward direction in this figure so as to form a plurality of indented portion 106 one by one which are arranged on the surface of the roll material 120 in a line in a longitudinal direction. When all indented portions 106 in one row are formed, the roll material 120 is given a prescribed rotation in a direction of an arrow 'a' by means of an index unit of a machining center not shown in the drawing so as to form a plurality of indented portion 106 of the next row. The above-mentioned operation is repeated until the indented portions are formed on the entire surface of the roll material 120. The roll produced in this manner is as same as the conventional thermal transfer roll 105 shown in FIG. 7. Subsequently, when a sleeve 130 shown in FIG. 3 which is made of a thin metal is fit over this thermal transfer roll 105, the thermal transfer roll 1 of the present invention having a flat or planar surface can be produced. The sleeve 130 has an approximately a thickness of 0.3 to 1 mm.

This thermal transfer roll 1 is heated by heating means which is incorporated in the inside thereof such as heating means which utilizes an electromagnetic induction or heating means which utilizes an oil heater. In comparison of portions 1a which do not correspond with indented portions 106 formed on the surface of the roll 1 with portions 1b which cover the indented portions 106, the portions 1a have a high temperature because of its good thermal conductivity while the portions 1b have a low temperature since the air in the indented portions 106 work as a thermal resistance. Namely, the heat transfer pattern which comprises the high temperature portions 1a and the low temperature portions 1b is formed on the surface of the thermal transfer roll 1.

Next, the manner of operation of the above-mentioned thermal transfer roll is hereinafter explained. It is assumed that the thermal transfer roll 1 of the present invention is mounted in place of the thermal transfer roll 105 in FIG. 6. The temperature of the metal sheet 101 is heated to a temperature range such that the elevated temperature is more than a temperature necessary for adhering the resin film on the can bottom but less than a temperature which lowers the degree of crystal orientation by means of the preceding heating rolls 104. On the other hand, the thermal transfer roll 1 is heated to a temperature range such that the temperature of the high temperature portions 1a is elevated up to a temperature which lowers the degree of crystal orientation of the resin film 102 while the temperature of the low temperature portion 1b is held below the temperature which lowers the degree of crystal orientation.

The portions of the metal sheet which come into contact with the high temperature portions 1a of the thermal transfer roll 1 exhibit an excellent adhesion to the resin film and the portions of the metal sheet which come into contact with the low temperature portions 1b is adhered to the resin film while holding the degree of crystal orientation of the resin film.

Since the thermal transfer roll 1 of the present invention is provided with the flat or planar surface, the metal sheet 101 does not take any damages on the surface thereof even when the sheet 101 is thermally extended or shrinked. Accordingly, the laminate plate 103 produced by this manufacturing apparatus for laminated plate for two piece can has no bubbles between the thin metal sheet and the resin film and exhibit an excellent corrosion resistance.

Then, the metal sheet on which the resin film is laminated is punched by a press based on the above-mentioned markings so as to produce blanks. A deep drawing is applied to each blank by a press so as to manufacture a two piece can. The two piece can stock materials which are obtained in this manner have a high degree of orientation at the can bottom portion as well as the can body portion so that they exhibit a prescribed denting resistance and the metal sheet is free from damages which may be caused by a thermal strain. Furthermore, no bubbles are present between the metal sheet and the laminated resin film so that the two piece cans can show an excellent corrosion resistance.

In case where the temperature of the metal sheet 110 before coming into contact with the thermal transfer roll 1 is an intermediate temperature between the temperature of the high temperature portions 1a and that of the low temperature portions 1b, the portions of the metal sheet 110 which come into contact with the high temperature portions 1a are heated while the portions of the metallic sheet 110 which come into contact with the low temperature portions 1b are cooled (or the heat quantity of such portions are taken away). Namely, since the thermal transfer roll of the present invention is provided with the flat or planar surface, heating and cooling can be carried out simultaneously, which makes the moving direction of the heat two-directional.

Figure 4A:
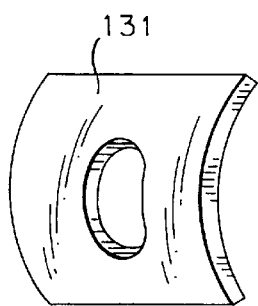
Figure 4B:
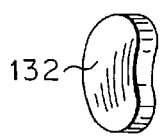
Figure 4C:
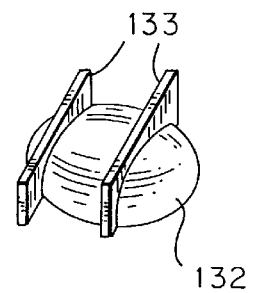
Figure 5A:
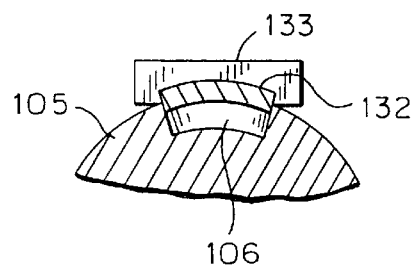
Figure 5B:
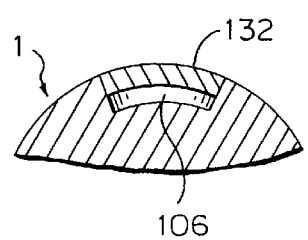

FIGS. 4a-4c and FIGS. 5a-5b show the second embodiment of the thermal transfer roll of the present invention. In this embodiment, the manufacturing steps of the second embodiment thereof is as same as the steps of the first embodiment until the thermal transfer roll having the same construction as the conventional thermal transfer roll 105 is produced by forming indented portions 106 with the end mill. In this second embodiment, however, as shown in FIGS. 4a-4b, the other plate is bent with a radius of curvature equal to the outer radius of of the roll material 120 to form a curved plate 131 and a lid body 132 which has slightly smaller diameter than that of indented portion 106 is punched from the curved plate 131. Subsequently, this lid body 132 is held on a positioning jig 133. While maintaining this condition, as shown in FIG. 5b, the lid body 132 is placed on the indented portion 106 so that the lid body 132 is separated from the bottom of the indented portion 106 thus defining cavity in the indented portion 106. Then the periphery of the lid body 132 is adhered to the periphery of the indented portion 106 by means of welding or the like and the positioning jig 133 is removed. At this stage, the lid body 132 is jutting out from the surface of the roll. When all the indented portions 106 are closed by the lid bodies 132 in the above-mentioned manner, the surface of the roll 120 is grounded or polished to make the surface flat or planar. As a result, the thermal transfer roll 1 having the same outer appearance and the flat surface as the roll shown in FIGS. 1a and 1b can be obtained. In this thermal transfer roll, the portions provided with no indented portion 106 define the high temperature portions 1a and the portions where lid bodies 132 are provided define the low temperature portions 1b. This thermal transfer roll has the same function as that of the thermal transfer roll shown in FIGS. 1a and 1b.

INDUSTRIAL APPLICABILITY

As has been described heretofore, the present invention is characterized in that a prescribed temperature distribution is given to the metal sheet or the roll while using the roll having flat or planar surface by varying the thermal resistance in the inside of the roll. Due to such a construction, in heating or cooling the thin plate metal particularly, even when the gradient of the temperature distribution is sharp, namely, an amount of the thermal strain is great, the surface of the thin plate metal takes no damage and the laminate plate as produced is effectively prevented from ring-shaped scratches.

We claim:

1. A method of heating a metal sheet by means of a thermal transfer roll having a prescribed heat transfer pattern comprising a high temperature portion and a low temperature portion formed on the surface of said thermal transfer roll by varying heat resistance inside said thermal transfer roll, wherein said low temperature portion comprises an indented portion formed on said thermal transfer roll, and a lid member for closing said indented portion, said method comprising heating said thermal transfer roll to the temperature range where said high temperature portion has a temperature which enables a lowering of the degree of crystal orientation of a resin film having crystal orientation, and bringing said thermal transfer roll into contact with a metal sheet so as to heat portions of the metal sheet which come into contact with said high temperature portions of said thermal transfer roll up to a temperature in which the degree of crystal orientation of the resin film can be lowered, and portions of the metal sheet which come into contact with said lower temperature portion of said thermal transfer roll are heated up to a temperature which is higher than a temperature necessary for adhering the resin film and lower than a temperature necessary for lowering the degree of the crystal orientation of the resin film.

2. A method of heating a metal sheet by means of a thermal transfer roll according to claim 1, wherein said high temperature portions of said thermal transfer roll heat said metal sheet while said low temperature portions of said thermal transfer roll cool said metal sheet.

3. A thermal transfer roll used for manufacturing laminated sheets which roll comes into contact with a metal sheet and heats the sheet, characterized in that the surface of said thermal transfer roll is formed flat and heat resistance inside said roll is varied such that a prescribed heat transfer pattern comprising a high temperature portion and a low temperature portion is formed on said roll surface, wherein said heat transfer pattern comprises indented portions formed on said thermal transfer roll corresponding to the low temperature portions of the heat transfer pattern and a thin metal sleeve which covers almost an entire surface of said thermal transfer roll.

4. A thermal transfer roll used for manufacturing laminated sheets which rolls comes into contact with a metal sheet and heats the sheet, characterized in that the surface of said thermal transfer roll is formed flat and heat resistance inside said roll is varied such that a prescribed heat transfer pattern comprising a high temperature portion and a low temperature portion is formed on said roll surface, wherein said low temperature portions comprise indented portions formed on said thermal transfer roll and lid members which are provided for closing said indented portions.

5. A method of heating a metal sheet by means of a thermal transfer roll having a prescribed heat transfer pattern comprising a high temperature portion and a low temperature portion formed on the surface of said thermal transfer roll by varying heat resistance inside said thermal transfer roll, wherein said heat transfer pattern comprises an indented portion corresponding to the low temperature portion and a thin metal sleeve which covers almost an entire surface of said thermal transfer roll, the method comprising heating said thermal transfer roll to the temperature range where said high temperature portion has a temperature which enables a lowering of the degree of crystal orientation of a resin film having crystal orientation, and bringing said thermal transfer roll into contact with a metal sheet so as to heat portions of the metal sheet which come into contact with said high temperature portions of said thermal transfer roll up to a temperature in which the degree of crystal orientation of the resin film can be lowered, and portions of the metal sheet which come into contact with said lower temperature portion of said thermal transfer roll are heated up to a temperature which is higher than a temperature necessary for adhering the resin film and lower than a temperature necessary for lowering the degree of the crystal orientation of the resin film.

6. A method of heating a metal sheet by means of a thermal transfer roll according to claim 5, wherein said high temperature portions of said thermal transfer roll heat said metal sheet while said low temperature portions of said thermal transfer roll cool said metal sheet.

7. A manufacturing apparatus for a laminated plate, which apparatus comprises a plurality of heating rolls which come into contact with a metal sheet so as to successively elevate the temperature of said metal sheet and heat at least one surface of the metal sheet up to a temperature which is higher than a temperature necessary for adhering a thermoplastic resin film, a thermal transfer roll downstream of said heating rolls, said thermal transfer roll having a heat transfer pattern comprising indented portions formed on said thermal transfer roll corresponding to low temperature portions, and a thin metal sleeve which covers almost an entire surface of said thermal transfer roll, and a laminating roll downstream of said thermal transfer roll which adheres the thermoplastic resin film supplied to at least one surface of said metal sheet onto said metal sheet under pressure.

8. A manufacturing apparatus for a laminated plate which apparatus comprises a plurality of heating rolls which come into contact with a metal sheet so as to successively elevate the temperature of said metal sheet and heat at least one surface of the metal sheet up to a temperature which is higher than a temperature necessary for adhering a thermoplastic resin film a thermal transfer roll downstream of said heating rolls, said thermal transfer roll having a flat surface and a prescribed heat transfer pattern consisting of high temperature portions and low temperature portions, said low temperature portions comprising indented portions formed on said thermal transfer roll and lid members for closing said indented portions, and a laminating roll downstream of said thermal transfer roll which adheres the thermoplastic resin film supplied to at least one surface of said metal sheet onto said metal sheet under pressure.

* * * * *